United States Patent
Collins et al.

(10) Patent No.: US 7,106,810 B2
(45) Date of Patent: Sep. 12, 2006

(54) METHOD AND APPARATUS FOR A DEMODULATOR CIRCUIT

(76) Inventors: Matthew James Collins, 6 Stambridge Cottages, Coalpit Rd., Bath (GB); Jonathan Parker, 66 Third Ave., Oldfield Pk., Bath (GB)

( * ) Notice: Subject to any disclaimer, the term of this patent is extended or adjusted under 35 U.S.C. 154(b) by 901 days.

(21) Appl. No.: 10/105,731

(22) Filed: Mar. 22, 2002

(65) Prior Publication Data
US 2002/0154711 A1 Oct. 24, 2002

(51) Int. Cl.
*H04L 27/06* (2006.01)
*H04J 11/00* (2006.01)

(52) U.S. Cl. .................. 375/316; 375/341; 370/208

(58) Field of Classification Search .......... 375/260, 375/222, 316, 295, 340, 341, 262, 261, 224–227; 370/208–210, 206, 207; 714/795, 786
See application file for complete search history.

(56) References Cited

U.S. PATENT DOCUMENTS

| | | | |
|---|---|---|---|
| 5,134,635 A | 7/1992 | Hong et al. ............... 375/94 |
| 5,229,767 A | 7/1993 | Winter et al. ............. 341/50 |
| 5,640,417 A | 6/1997 | Barabash et al. .......... 375/222 |
| 6,144,711 A * | 11/2000 | Raleigh et al. ............ 375/347 |
| 6,320,917 B1 * | 11/2001 | Stott et al. ................ 375/344 |
| 6,359,938 B1 * | 3/2002 | Keevill et al. ............. 375/316 |
| 2004/0091058 A1 * | 5/2004 | Tosalo et al. ............. 375/261 |

FOREIGN PATENT DOCUMENTS

| | | |
|---|---|---|
| EP | 0501448 | 2/1992 |
| EP | 0887975 | 6/1998 |
| EP | 0991239 A2 | 9/1999 |
| GB | 2319148 | 9/1996 |
| GB | 2326070 | 5/1998 |
| GB | 2340353 | 5/1999 |
| GB | 2342546 | 9/1999 |
| GB | 2355164 | 10/1999 |
| WO | WO97/13378 | 10/1996 |
| WO | WO98/27681 | 12/1997 |

OTHER PUBLICATIONS

Tosato et al., "Simplified Soft-output Demapper for Binary Interleaved COFDM with Application to HIPERLAN/2," IEEE, 2002, pp. 664-668.*
Park, et al., A Demapping Method Using the Pilots in COFDM System, IEEE Transactions on Consumer Electronics, vol. 44, No. 3, Aug. 1998.
Lee et al., Viterbi Decoding Method Using Channel State Information in COFDM System, IEEE, 1999, pp. 66-67.
Lee, et al., "Performance Analysis of Viterbi Decoder Using Channel State Information in COFDM System", IEEE Transactions on Broadcasting, vol. 44, No. 4, Dec. 1998, pp. 488-496.

* cited by examiner

*Primary Examiner*—Tesfaldet Bocure

(57) ABSTRACT

A method and apparatus for a demodulator circuit in a communication system is described. The invention relates to a demodulator circuit in a communication system using a multi-carrier modulation scheme. The demodulator makes efficient use of channel state information for respective carriers in the multi-carrier modulation to de-map the received data. An efficient method of calculating channel state information is also disclosed.

32 Claims, 3 Drawing Sheets

METHOD AND APPARATUS FOR A DEMODULATOR CIRCUIT

CROSS-REFERENCE TO RELATED APPLICATION

This application claims priority under 35 U.S.C. §§ 120 and 363 to PCT International Application No. PCT/US00/40993, entitled "Demodulator Circuit", filed on Sep. 26$^{th}$, 2000, published under PCT Article 21(2) in English, which PCT application claims priority to Great Britain Application Number 9923763.8, filed on Oct. 7$^{th}$, 1999, both applications hereby incorporated by reference herein.

BACKGROUND

1. Field

This invention relates to the field of demodulator circuits in a communication system using a multi-carrier modulation scheme, and more particularly to a method and apparatus for demodulating received signals in a COFDM demodulator for a digital television receiver.

2. Description of Related Art

Recently there has been a rapid development in the field of digital television broadcasting following the establishment of the European Digital Video Broadcast standard for digital terrestrial television (DVB-T) developed by the Digital Video Broadcasting Group. In accordance with the DVB-T standard, a number of carrier frequencies are provided and data to be transmitted is spread over a large number of orthogonal data carriers using Coded Orthogonal Frequency Division Multiplexing (COFDM). Each carrier can be encoded to carry a symbol containing more than one bit, for example by using a rectangular constellation modulation system such as 16-QAM, as is known to a skilled person in the communication and modulation arts.

An exemplary 16-QAM constellation diagram is shown in FIG. 1. As is known to a skilled person, each point on the 16-QAM constellation diagram corresponds to a 4-bit symbol. The symbols are normally assigned to the constellation points using Gray coding, in which symbols with similar most significant bits are grouped together.

At the transmitter, the carriers are modulated in accordance with successive symbols to be transmitted and each received signal is demodulated in the receiver to the corresponding symbol using the constellation diagram. In most cases the signal received will not correspond exactly with a constellation point because of interference or noise in the channel between the transmitter and the receiver. In this situation the receiver must demodulate the received signal to the symbol corresponding to the constellation point that is most likely to have been transmitted.

It is known to de-map signals using soft decision decoding in which instead of a "hard" decision as to whether a bit should be decoded as a logical "1" or as a logical "0", a "soft" decision, comprising the hard decision and an indication of the level of confidence to be placed in the decision is output. In simple systems the level of confidence that can be placed on the demodulated or de-mapped information is proportional to the distance or separation of the received signal from the expected constellation point. Clearly, the closer the received signal is to a constellation point, the more confidence can be placed in the de-mapped symbol. When Gray coding is used, the level of confidence that can be placed in a particular de-mapped bit varies from bit to bit within the symbol.

The information from the de-mapper is passed to a Viterbi decoder, which decodes the bits. This soft decision information can be input into a soft decision Viterbi decoder. A soft decision Viterbi decoder maintains a history of many possible transmitted sequences and builds up a view of their relative likelihoods. The Viterbi decoder selects a logical "0" or a logical "1" as the decoded bit based on the maximum likelihood. In this way the Viterbi decoder can exploit information relating to the expected reliability of each bit based on the proximity of each bit to the expected constellation point.

One problem with television broadcasting is the existence of multi-paths arising either as a result of the reception at the receiver of multiple copies of the signal emitted from a single transmitter, or as a result of the reception of signals from a number of transmitters all broadcasting the same signal. In the frequency domain, the existence of multi-paths is equivalent to a frequency selective channel response.

Furthermore, in situations where conventional analog television signals are transmitted within or overlapping the frequency range used by the digital television signal, the conventional analog television signals act as narrow interfering signals within the signal bandwidth of the digital television signal.

The aforementioned frequency selective channel response characteristic results in a large number of different carriers used in COFDM modulation having different signal-to-noise ratios (SNR). Clearly, data conveyed by carriers having a high SNR is likely to be more reliable than data conveyed by carriers having a low SNR.

An estimate of the SNR of each carrier made by the receiver is referred to as the "channel state information (CSI) for the channel represented by that carrier". FIG. 2 illustrates a typical variation in carrier CSI for a COFDM signal with co-channel analog television interference.

One known method of establishing channel state information for a COFDM signal is disclosed in the article entitled "A demapping method using the pilots in COFDM system", IEEE Transactions on Consumer Electronics, Vol 44 No. 3, August 1998, pp. 1150–1153. The aforementioned method uses the fact that pilot carriers with known magnitudes are transmitted with the COFDM signal (for equalization purposes). An estimate of the mean square error in the magnitude of the received pilot carriers is performed and channel state information in the pilot carrier positions can be obtained from the estimate. The channel state information in useful data positions can be obtained by subsequent interpolation between the values calculated at the pilot carrier frequencies.

In order to provide robust performance of the system in an environment having a frequency selective channel response, it is known to use the channel state information in the Viterbi decoder when decoding the bits in order to provide extra information regarding the reliability of the bits based on the signal-to-noise ratio of the carrier.

The article entitled "Performance analysis of Viterbi Decoder using channel state information in COFDM System", IEEE Transactions on Broadcasting, Vol 44 No. 4, December 1998, pp. 488–496, describes a Viterbi decoder which uses channel state information calculated from a mean square estimation of the received pilot carrier signals in a COFDM system, to affect the Viterbi decoder branch metric values used to decode 3 or 4 bit soft decision data.

Previously it has also been suggested that if the channel state information of a particular channel is sufficiently bad, it can be concluded that no reliance can be placed on the data received on that channel. As a result, the Viterbi decoder may effectively record that no information is available regarding that bit by disregarding, or "puncturing" the corresponding bit or bits.

The transmitted data is coded using a convolutional code, which introduces redundancy in the signal in order to allow error correction of the signal to be achieved. The effect of the puncturing of data bits in the Viterbi decoder as indicated above, is merely to reduce the effective code rate of the signal. If a sufficiently robust code is used, the effective reduction in code rate resulting from the puncturing of bits can be tolerated, thus avoiding an impact on the decoded signal quality.

Therefore, a need exists for a method and apparatus for demodulating radio frequency signals in a communication system that can be easily implemented and overcomes the disadvantages of other methods and apparatuses such as the above-described known systems. The present disclosure provides such a demodulator circuit method and apparatus.

SUMMARY

Previously known demodulator circuits are complex because the calculated channel state information must be fed forward to the Viterbi decoder through the deinterleaver. In addition, the previously known methods of calculating CSI from a received signal are computationally intensive.

The invention seeks to at least alleviate some of the problems associated with the previously known arrangements. In particular the invention provides means for demapping data effectively using channel state information. In addition, an effective method of calculation of channel state information for carriers in a multi-carrier communication system is disclosed.

In accordance with a first aspect of the invention, there is provided a demodulator circuit for demodulating a multi-carrier modulated signal, having de-mapping means for de-mapping the received signal to generate decision data, the decision data being generated in a manner dependent on channel state information for the respective signal carrier; and a decoder for decoding the received bits from the decision data received from the de-mapping means.

In accordance with a second aspect of the invention, there is provided a receiver circuit for receiving a multi-carrier modulated signal, comprising means for establishing channel state information for the carriers of the multi-carrier modulated signal from the displacements of received signals on that carrier from the corresponding nearest expected signal, over a number of received signals.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The present inventive method and apparatus for a demodulator circuit generates decision data that incorporates channel state information (CSI) and feeds the decision data forward to a decoder. CSI is used by a de-mapping block to affect both the de-mapped data and the soft decision data assigned to each de-mapped data bit. Thus, CSI is used to simplify the de-mapping of a received signal. As a result, it is not necessary to pass CSI through a deinterleaving process to a Viterbi decoder as separate information. The aforementioned result has the significant advantage of reducing data path widths and power requirements, as compared to prior art approaches.

Figure 1:
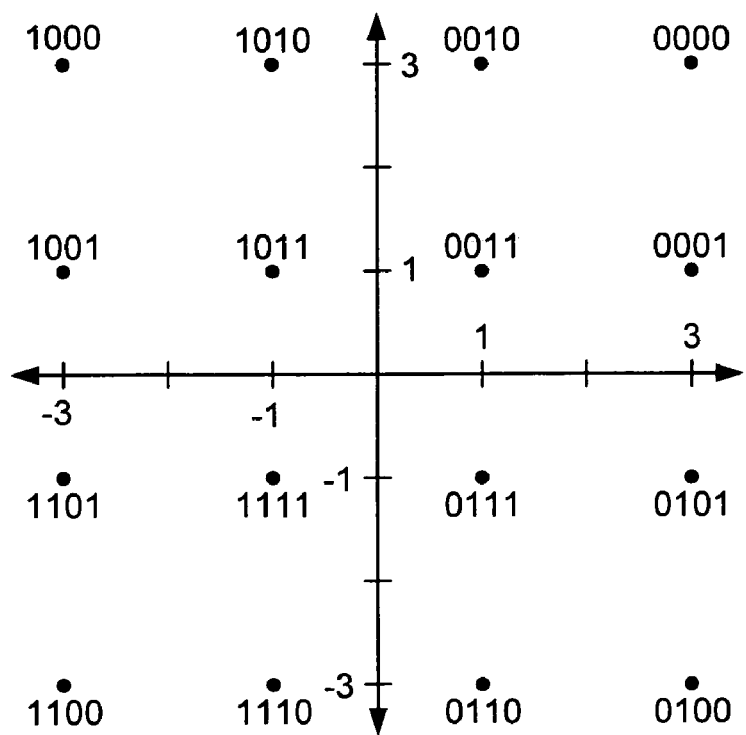
FIG. 1 is an exemplary diagrammatic representation of a 16-QAM constellation diagram.
Figure 2:
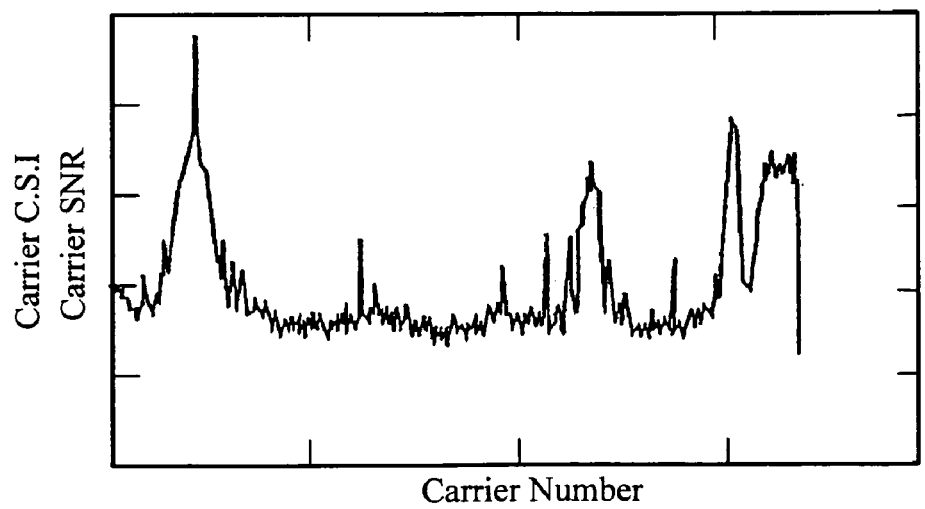
FIG. 2 illustrates a typical variation in carrier CSI for a COFDM signal with co-channel analog television interference.
Figure 3:
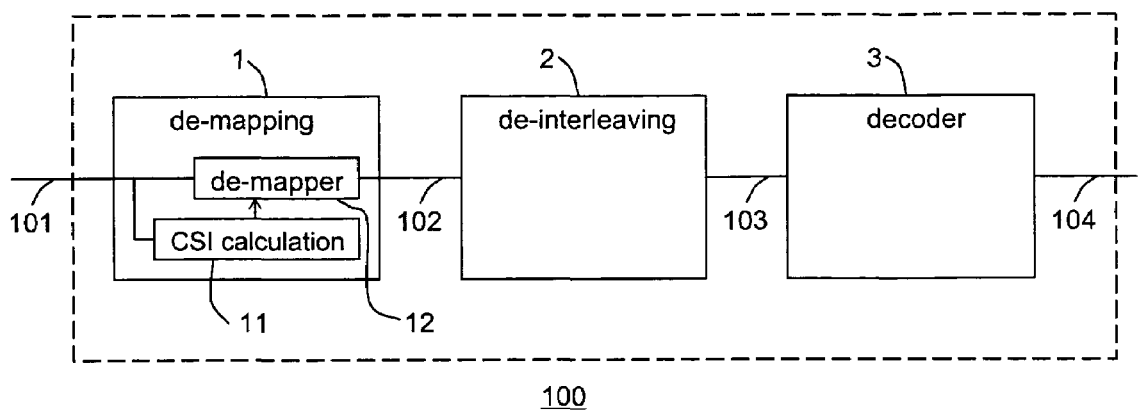
FIG. 3 is a diagrammatic representation of the main components of a demodulator circuit in accordance with the invention.

FIG. 3 is a diagrammatic representation of the main components of a demodulator circuit in accordance with an embodiment of the invention. The demodulator circuit includes a demapping block 1, a bit and symbol de-interleaving block 2 and a Viterbi decoder 3. The received de-modulated signal is applied to the input of the de-mapping block 1 and the demapping block 1 de-maps the received signal and outputs decision data comprising an estimate of the transmitted data together with an indication of the level of confidence to be placed in the estimate. The decision data output from the de-mapping block 1 is input to the bit and symbol de-interleaving block 2. The de-interleaved decision data is input to the Viterbi decoder 3, which generates a demodulated output based on the input decision data.

The de-mapping block 1 includes a channel state information (CSI) calculation block 11 and a de-mapper 12. The CSI calculation block 11 determines the channel state information for each carrier used in the multi-carrier modulated signal. The channel state information calculated by the CSI calculation block 11 is used by the de-mapper 12 to generate decision data for a received signal using that carrier in a manner dependent on the channel state information for the respective carrier.

Specifically if the channel state information for the carrier is such that the de-mapper 12 can establish that the SNR on the channel is relatively good (i.e., the channel is fairly quiet), the de-mapper 12 may generate decision data in which the soft decision data is selected in dependence on the distance to the nearest constellation point. In contrast, if the channel state information for the carrier is such that the de-mapper 12 can establish that the SNR on the channel is relatively bad (i.e., the channel is fairly noisy), the de-mapper 12 may generate decision data in which the soft decision data is selected in dependence on the channel state information.

In accordance with the invention, therefore, the channel state information is incorporated by the de-mapper 12 in the decision data, and all the CSI functions are contained within the de-mapping block 1. As a result it is not necessary to pass channel state information through the de-interleaving process to the Viterbi decoder as separate information, resulting in reduced data path widths and reduced power requirements.

Figure 4:
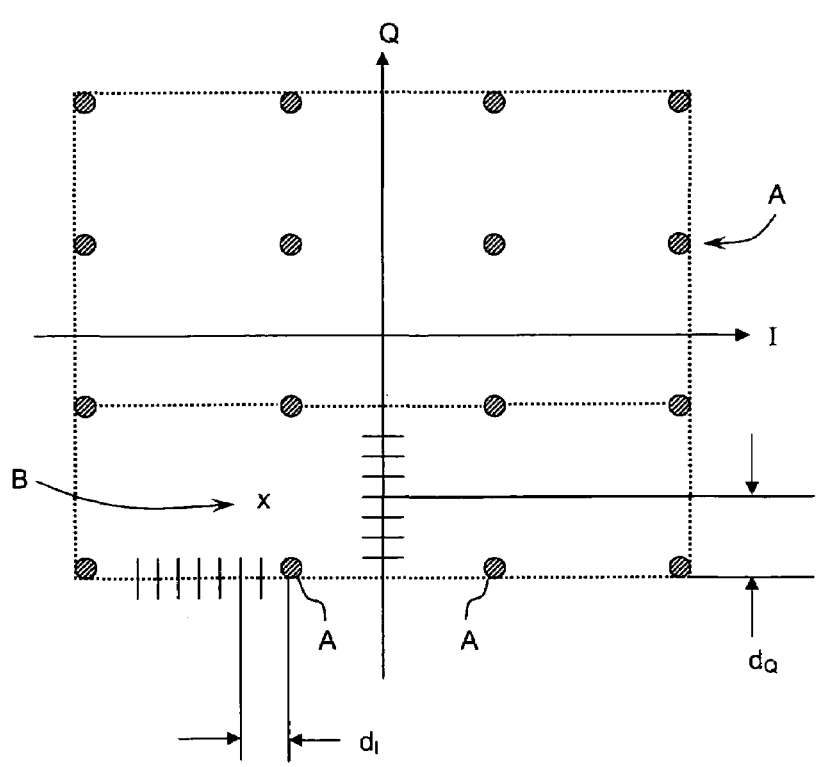
FIG. 4 is an exemplary diagrammatic representation of a 16-QAM constellation diagram, showing the soft decision regions between the points on the constellation grid.

The channel state information may be calculated in a number of ways in accordance with the invention. One exemplary embodiment for calculating the channel state information in the CSI calculation block 11 is now described with reference to FIG. 4. FIG. 4 shows a constellation grid for a 16 QAM system, which is described herein as an exemplary transmission system. As is known to a skilled person, each constellation point A on the constellation diagram represents the phase/amplitude characteristic of an expected signal (i.e., a possible transmitted signal). However, the actual received signal is normally different from the expected constellation point, as indicated by the received signal point B.

In accordance with the exemplary embodiment of the invention described with reference to FIG. 4, to estimate the CSI for each carrier, the separation of the received signal point B from the nearest possible transmitted constellation point A in the I/Q signal space is evaluated and accumulated over a number of received signals for that carrier.

In accordance with one embodiment of the invention, the quantized distances in the I and Q axis directions between the received signal point B and the nearest constellation point A are calculated and are summed, for each carrier, over a number of symbols received on that carrier. The accumulated value can be used as a measure of the SNR (i.e., as the (CSI)) for that carrier.

In another embodiment of the invention, the actual distance from the received point B to the nearest constellation point A is calculated for each received symbol and the channel state information for a particular carrier is determined by accumulating this distance over a number of symbols received for that carrier. Those skilled in the communication art shall recognize that the channel state information can be determined by using alternative methods such as averaging on the distances measured for the individual received symbols without departing from the scope or spirit of the present invention.

The value established in accordance with any of the above-described methods can be taken as a measure of the CSI of the channel because when the channel is relatively noisy the signal point B corresponding to the received symbol is likely to be at a greater distance in the I/Q plane from the expected constellation points A than when the channel has less noise. Thus, there is described above an advantageous method of calculation of the CSI, which can be used advantageously in the prior art demodulator circuits as well as in the demodulator circuit of the present invention.

The CSI value established as outlined above is advantageously used in the establishment of the soft decision data to be used during de-mapping of the data in the de-mapping block 1 shown in FIG. 3. An exemplary method for de-mapping data in the de-mapping block 1 shown in FIG. 3 using channel state information calculated as described with reference to FIG. 4 is now described with reference to FIG. 5.

Figure 5:
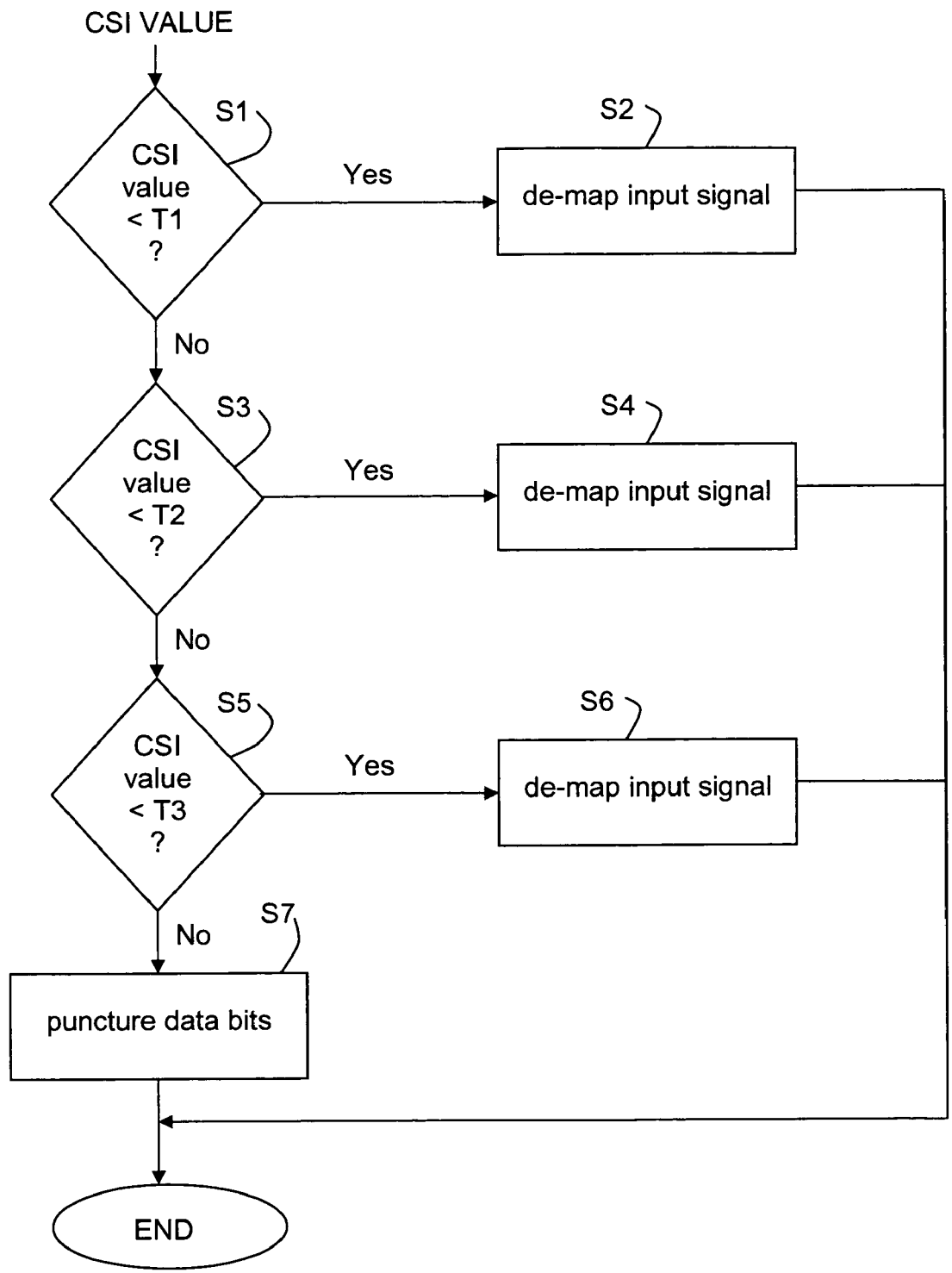
FIG. 5 is a flow chart showing the de-mapping method in accordance with one embodiment of the invention.

FIG. 5 is a flowchart showing the de-mapping method in accordance with one embodiment of the invention. The method begins at a decision STEP S1 whereat the CSI value for the channel carrying a signal to be demodulated is compared with a first threshold T1. When the CSI value is less than the first threshold, the carrier can be considered to have a good signal-to-noise ratio, and therefore it can be expected that the received constellation points should be close to the transmitted constellation points. If the CSI value is less than the first threshold, the method proceeds to a STEP S2, else the method proceeds to a decision STEP S3.

At the STEP S2, the input signal may be de-mapped in accordance with known techniques according to the position of the received signal in the constellation grid. The soft decision data representing the quantized distance between the received constellation point and the expected constellation point may be assigned to the de-mapped bits. After the STEP S2, the method ends.

At the decision STEP S3, the method compares the CSI value to a second threshold T2, which is higher than the first threshold T1. When the CSI value is between T1 and T2 (i.e., T1<CSI value<T2) the carrier can be considered to have a slightly less than good signal-to-noise ratio. If the CSI value is less than T2, the method proceeds to a STEP S4, else the method proceeds to a decision STEP S5.

At the STEP S4, the method de-maps the signal to the nearest constellation point, and soft decision data for each de-mapped bit is assigned in dependence on the position within the Gray coding. Because symbols having similar most significant bits are grouped together in a Gray coding constellation diagram, more confidence can be placed in the most significant bits of the received symbol than in the least significant bits.

At the decision STEP S5, the method compares the CSI value to a third threshold T3, which is higher than the second threshold T2, and thus also higher than the first threshold T1. If the CSI value is less than T3, the method proceeds to a STEP S6, else the method proceeds to a STEP S7.

When the CSI value is between T2 and T3 (i.e., T2<CSI value<T3) the carrier can be considered to have a relatively bad signal-to-noise ratio. At the STEP S6, the method de-maps data using the nearest constellation point and each data bit is given soft decision data indicating the lowest possible confidence level.

When the CSI value is greater than the third threshold T3, the carrier can be considered to have an extremely bad signal-to-noise ratio, and thus no reliance can be placed on the decoded bits. At the STEP S7, the method punctures all data bits.

It will be clear to the skilled person that while the invention has been described with reference to the use of thresholds with which to compare the calculated CSI, the use of thresholds is not essential to the invention.

Although as described above a high value of CSI indicates a noisy channel, it is possible that a measure of CSI is used in which a low value of CSI indicates a noisy channel. In this situation adjustments to the relative magnitudes of the thresholds T1, T2 and T3 and to the method described above with reference to FIG. 5 would be required, as would be clear to a skilled person.

In another embodiment of the invention, soft decision data for the de-mapped data may be generated in the de-mapper by initially generating first data based on the distance between the received signal point and the nearest expected constellation point and then by altering said first data, depending on the channel state information for that carrier, to obtain the soft decision data. This embodiment is particularly advantageous when implemented in an arrangement in which the separation of the received signal point and the nearest expected constellation point is determined to establish the channel state information for that carrier, since the calculation of the separation of the received signal point and the nearest expected constellation point can be used both in the generation of the soft decision data and also to update the channel state information for that carrier.

SUMMARY

A novel method and apparatus for a demodulator circuit has been described. The present inventive method and apparatus for a demodulator circuit generates decision data that incorporates channel state information (CSI) and feeds the decision data forward to a decoder. CSI is used by a de-mapping block to affect both the de-mapped data and the soft decision data assigned to each de-mapped data bit. Thus, CSI is used to simplify the de-mapping of a received signal. As a result, it is not necessary to pass CSI through a deinterleaving process to a Viterbi decoder as separate information. The aforementioned result has the significant advantage of reducing data path widths and power requirements, as compared to prior art approaches. The disclosed methods and apparatus can be utilized with a number of communication systems, including, without limitation, a television communication system.

The demodulator circuit of the present invention demodulates a multi-carrier modulated signal and comprises a de-mapping means and a decoder. The de-mapping means de-maps received signals to generate decision data, the decision data being generated in a manner dependent on channel state information for the respective signal carrier. The decoder decodes the received bits from the decision data received from the de-mapping means.

A number of embodiments have been described. Nevertheless, it will be understood that various modifications may be made without departing from the spirit and scope of the invention. For example, the present inventive method and apparatus can be implemented in software, hardware, or in a software/hardware combination. Furthermore, the present inventive method and apparatus can be used in virtually any type of communication system. Its use is not limited to a European DVB-T standard-based communication system. Alternatively, the present invention can be used in a North American television standard-based communication system. Accordingly, it is to be understood that the invention is not to be limited by the specific illustrated embodiment, but only by the scope of the appended claims.

What is claimed is:

1. A demodulator circuit, wherein the demodulator circuit receives and demodulates a multi-carrier modulated (MCM) signal, and wherein the MCM signal comprises a plurality of carriers, comprising:
    (a) a de-mapping device, adapted to receive the MCM signal, wherein the demapping device generates decision data, comprising:
        (1) a channel state information (CSI) calculation device adapted to receive the MCM signal, wherein the CSI calculation device determines CSI for each carrier of the plurality of carriers and outputs an information signal comprising information regarding CSI for each carrier; and
        (2) a de-mapper adapted to receive the MCM signal and the information signal, operatively connected to the CSI calculation device, wherein the de-mapper uses the information signal to de-map the MCM signal, and wherein the de-mapper generates and outputs a decision data signal comprising decision data, the decision data including:
            a first type decision data based only on the MCM signal when the channel state information for a respective signal carrier indicates that a channel associated with the respective signal carrier is relatively good; and
            a second type decision data affected by the channel state information when the channel state information for the respective signal carrier indicates that the channel associated with the respective signal carrier is relatively bad; and
    (b) a decoder, operatively connected to the de-mapping device, wherein the decoder decodes the decision data signal.

2. The demodulator circuit as set forth in claim 1, wherein the first type decision data comprises an estimate of a pre-decoded bit and soft decision data derived from a difference between the MCM signal and an expected signal.

3. The demodulator circuit as set forth in claim 1, wherein the second type decision data comprises an estimate of a pre-decoded bit and soft decision data derived from the CSI and a difference between the MCM signal and an expected signal.

4. The demodulator circuit as set forth in claim 1, wherein the second type decision data signal comprises an estimate of a pre-decoded bit and soft decision data derived from the CSI.

5. The demodulator circuit as set forth in claim 1, wherein the decision data generated by the de-mapping device is punctured when the CSI for the respective signal carrier indicates that the channel for the carrier associated with the respective signal carrier is sufficiently bad that the data is unreliable.

6. The demodulator circuit as set forth in claim 1, wherein the channel state information calculation device estimates the CSI for each carrier of the plurality of carriers from a displacement of the MCM signal from an expected signal for a plurality of signals received on that carrier.

7. The demodulator circuit as set forth in claim 1, wherein the channel state information calculation device estimates the CSI for each carrier of the plurality of carriers by determining displacement on I and Q axes in an I/Q plane for a plurality of symbols received on that carrier.

8. The demodulator circuit as set forth in claim 1, wherein the decoder is a Viterbi decoder.

9. The demodulator circuit as set forth in claim 1, wherein the MCM signal is a COFDM signal.

10. A digital television receiver comprising a demodulator circuit as set forth in claim 9.

11. A receiver, wherein data is received by the receiver in a multi-channel modulation (MCM) received signal, the receiver comprising the demodulator circuit as set forth in claim 1.

12. A communication system including at least one transmitter and at least one receiver, wherein data is received by a receiver in a multi-channel modulation (MCM) received signal, the communication system comprising:
    (a) at least one transmitter; and
    (b) at least one receiver comprising the demodulator circuit as set forth in claim 1.

13. A method of demodulating a multi-carrier modulated (MCM) received signal, the method comprising the acts of:
    (a) calculating channel state information (CSI) for each carrier used in the MCM received signal;
    (b) demapping the MCM received signal based on the CSI calculated in act (a);
    (c) generating decision data based on the CSI calculated in act (a), wherein generating includes:
        generating a first type decision data based only on the MCM signal when the channel state information for a respective signal carrier indicates that a channel associated with the respective signal carrier is relatively good; and generating a second type decision data affected by the channel state information when the channel state information for the respective signal carrier indicates that the channel associated with the respective signal carrier is relatively bad; and (d) decoding the decision data.

14. The method as set forth in claim 13, wherein the first type decision data comprises an estimate of a pre-decoded bit and soft decision data derived from a difference between the MCM signal and an expected signal.

15. The method as set forth in claim 13, wherein the second type decision data comprises an estimate of a pre-decoded bit and soft decision data derived from the CSI and a difference between the MCM signal and an expected signal.

16. The method as set forth in claim 13, wherein the second type decision data comprises an estimate of a pre-decoded bit and soft decision data derived from the CSI.

17. The method as set forth in claim 13, wherein the decision data generated by the act (c) is punctured when the CSI for the respective signal carrier indicates that the channel for the carrier associated with the respective signal carrier is sufficiently bad that the data is unreliable.

18. The method as set forth in claim 13, wherein the calculating channel state information act (a) estimates the CSI for each carrier of the plurality of carriers from a displacement of the MCM signal from an expected signal for a plurality of signals received on that carrier.

19. The method as set forth in claim 13, wherein the calculating channel state information act (a) estimates the CSI for each carrier of the plurality of carriers by determining displacement on I and Q axes in an I/Q plane for a plurality of symbols received on that carrier 20. The method as set forth in claim 13, wherein the decoding act (d) is performed using a Viterbi decoder.

21. The method as set forth in claim 13, wherein the MCM signal is a COFDM signal.

22. A method of demodulating a multi-carrier modulated (MCM) received signal, the method comprising the acts of:

(a) receiving a MCM received signal;

(b) calculating channel state information (CSI) for each carrier used in the MCM received signal;

(c) de-mapping the MCM received signal to a received constellation point;

(d) determining whether the CSI is less than a first threshold;

(e) calculating decision data comprising an estimate of a pre-decoded bit and soft decision data based on a displacement between the received constellation point and an expected constellation point and returning to act (a) if the CSI is less than the first threshold;

(1) determining whether the CSI is less than a second threshold, wherein the second threshold is greater than the first threshold;

(g) calculating decision data comprising an estimate of a pre-decoded bit and soft decision data based on a position within a Gray coding and returning to act (a) if the CSI is less than the second threshold;

(h) determining whether the CSI is less than a third threshold, wherein the third threshold is greater than the second threshold;

(i) calculating decision data comprising an estimate of a pre-decoded bit and soft decision data indicating a low confidence level if the CSI is less than the third threshold;

(j) puncturing all bits associated with the MCM received signal if the CSI is greater than or equal to the third threshold; and (k) returning to act (a).

23. An apparatus for demodulating a multi-carrier modulated (MCM) received signal, the apparatus comprising;

(a) means for calculating channel state information (CSI) for each carrier used in the MCM received signal;

(b) means, operatively connected to the calculating CSI means, for de-mapping the MCM received signal based on the CSI calculated in act (a) and generating decision data based on the CSI calculated in act (a), the de-mapping means including:

means for generating a first type decision data based only on the MCM signal when the channel state information for a respective signal carrier indicates that a channel associated with the respective signal carrier is relatively good; and means for generating a second type decision data affected by the channel state information when the channel state information for the respective signal carrier indicates that the channel associated with the respective signal carrier is relatively bad; and (c) means, operatively connected to the de-mapping means, for decoding the decision data.

24. The apparatus as set forth in claim 23, wherein the first type decision data comprises an estimate of a pre-decoded bit and soft decision data derived from a difference between the MCM signal and an expected signal.

25. The apparatus as set forth in claim 23, wherein the second type decision data comprises an estimate of a pre-decoded bit and soft decision data derived from the CSI and a difference between the MCM signal and an expected signal.

26. The apparatus as set forth in claim 23, wherein the second type decision data comprises an estimate of a pre-decoded bit and soft decision data derived from the CSI.

27. The apparatus as set forth in claim 23, wherein the decision data generated by the de-mapping means is punctured when the CSI for the respective signal carrier indicates that the channel for the carrier associated with the respective signal carrier is sufficiently bad that the data is unreliable.

28. The apparatus as set forth in claim 23, wherein the calculating CSI means estimates the CSI for each carrier of the plurality of carriers from a displacement of the MCM signal from an expected signal for a plurality of signals received on that carrier.

29. The apparatus as set forth in claim 23, wherein the calculating CSI means estimates the CSI for each carrier of the plurality of carriers by determining displacement on I and Q axes in an I/Q plane for a plurality of symbols received on that carrier.

30. The apparatus as set forth in claim 23, wherein the decoding means is performed using a Viterbi decoder.

31. The apparatus as set forth in claim 23, wherein the MCM signal is a COFDM signal.

32. A computer program executable on a general purpose computing device, wherein the program is capable of demodulating a multi-carrier modulated (MCM) received signal, the computer program comprising:
  (a) a first set of instructions for calculating channel state information (CSI) for each carrier used in the MCM received signal;
  (b) a second set of instructions for de-mapping the MCM received signal based on the CSI calculated by the first set of instructions;
  (c) a third set of instructions for generating decision data based on the CSI calculated by the first set of instructions, the third set of instructions including:
    a first set of sub-instructions for generating a first type decision data based only on the MCM signal when the channel state information for a respective signal carrier indicates that a channel associated with the respective signal carrier is relatively good; and
    a second set of sub-instructions for generating a second type decision data affected by the channel state information when the channel state information for the respective signal carrier indicates that the channel associated with the respective signal carrier is relatively bad; and
  (d) a fourth set of instructions for decoding the decision data.

\* \* \* \* \*